(12) United States Patent
Ide

(10) Patent No.: US 9,667,144 B2
(45) Date of Patent: *May 30, 2017

(54) DC-DC CONVERTER WITH REVERSE CURRENT DETECTING CIRCUIT

(71) Applicant: Renesas Electronics Corporation, Koutou-ku, Tokyo (JP)

(72) Inventor: Yohei Ide, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 14/931,357

(22) Filed: Nov. 3, 2015

(65) Prior Publication Data

US 2016/0056722 A1 Feb. 25, 2016

Related U.S. Application Data

(63) Continuation of application No. 13/678,776, filed on Nov. 16, 2012, now Pat. No. 9,203,316.

(30) Foreign Application Priority Data

Nov. 17, 2011 (JP) ................... 2011-251953

(51) Int. Cl.
*H02M 3/158* (2006.01)
*G05F 1/46* (2006.01)
*H02M 1/00* (2006.01)

(52) U.S. Cl.
CPC ............ *H02M 3/158* (2013.01); *G05F 1/468* (2013.01); *H02M 3/1582* (2013.01); *H02M 3/1588* (2013.01); *H02M 2001/0032* (2013.01); *Y02B 70/1466* (2013.01); *Y02B 70/16* (2013.01)

(58) Field of Classification Search
CPC .............. H02M 2001/0009; H02M 2001/0032
See application file for complete search history.

(56) References Cited

U.S. PATENT DOCUMENTS

| 6,437,549 | B1 | 8/2002 | Takagishi | |
| 2006/0164057 | A1* | 7/2006 | Kudo | ................... H02M 3/1588 323/282 |
| 2008/0068868 | A1 | 3/2008 | Williams | |
| 2008/0100274 | A1 | 5/2008 | Hayakawa | |

(Continued)

FOREIGN PATENT DOCUMENTS

JP 2010-239778 A 10/2010

*Primary Examiner* — Timothy J Dole
*Assistant Examiner* — Yusef Ahmed
(74) *Attorney, Agent, or Firm* — Sughrue Mion, PLLC

(57) ABSTRACT

A DC-DC converter includes a first switching element and a second switching element; a pulse signal generating circuit which generates a pulse signal used to control on/off periods of the switching elements; a limiting circuit which generates a minimum pulse width signal; a selector configured to select one of the pulse signal and the minimum pulse width signal, and a driver circuit switches the first and second switching element and a reverse current detecting circuit detects a reverse current. The driver circuit controls the first or second switching element, when the reverse current is detected. The selector selects the pulse signal when the reverse current is not detected, and selects the minimum pulse width signal when the reverse current is detected.

10 Claims, 7 Drawing Sheets

(56) References Cited

U.S. PATENT DOCUMENTS

| | | | |
|---|---|---|---|
| 2008/0197821 A1 | 8/2008 | Hasegawa et al. | |
| 2008/0278129 A1 | 11/2008 | Shimizu | |
| 2009/0045791 A1* | 2/2009 | Feng | H02M 3/1588 323/282 |
| 2009/0058383 A1* | 3/2009 | Ryoo | H02M 3/156 323/282 |
| 2009/0218999 A1* | 9/2009 | Kikuchi | H02M 3/156 323/282 |
| 2009/0295350 A1* | 12/2009 | Yamada | H02M 3/1588 323/282 |
| 2009/0302816 A1 | 12/2009 | Kunimatsu | |
| 2010/0102788 A1 | 4/2010 | Kuroyabu et al. | |
| 2010/0134078 A1 | 6/2010 | Murakami et al. | |
| 2010/0201336 A1* | 8/2010 | Chen | H02M 3/1588 323/285 |
| 2010/0237841 A1 | 9/2010 | Matsuo et al. | |
| 2010/0270989 A1 | 10/2010 | Sasaki et al. | |
| 2010/0283442 A1* | 11/2010 | Nakashima | H02M 3/1588 323/283 |
| 2010/0301822 A1* | 12/2010 | Chen | H02M 3/156 323/283 |
| 2011/0018515 A1* | 1/2011 | McCloy-Stevens | H02M 3/1588 323/284 |
| 2011/0121804 A1 | 5/2011 | Kudo | |
| 2012/0105031 A1* | 5/2012 | Kumagai | H02M 3/156 323/271 |
| 2012/0223691 A1 | 9/2012 | Weinstein et al. | |
| 2013/0049717 A1 | 2/2013 | Mizutani et al. | |
| 2013/0293211 A1* | 11/2013 | Chen | H02M 3/1588 323/282 |
| 2013/0335047 A1 | 12/2013 | Yamaguchi | |
| 2015/0061615 A1* | 3/2015 | Michishita | H02M 3/1588 323/271 |
| 2015/0229212 A1* | 8/2015 | Shiwaya | H02M 3/158 323/282 |

* cited by examiner

DC-DC CONVERTER WITH REVERSE CURRENT DETECTING CIRCUIT

CROSS REFERENCE

This application is a Continuation application of U.S. application Ser. No. 13/678,776, filed on Nov. 16, 2012, which claims priority from the disclosure of Japanese Patent Application No. JP 2011-251953 filed on Nov. 17, 2011 the disclosure thereof is incorporated herein by reference in their entirety.

FIELD OF THE INVENTION

The present invention relates to a DC-DC converter.

BACKGROUND ART

Electrical appliances such as a digital camera set require various power supply voltages in order to drive a motor, a memory, a speaker, a backlight, and so forth. A synchronous rectifying type DC-DC converter is used to convert an input voltage to a desired voltage. In a present market of digital cameras, for example, low-power-consumption and long-time operation are required. In order to achieve the long-time operation, improvement of power efficiency is required for DC-DC converters. As a result, although being not considered in the past, high power efficiency is now required even in a case of no load or a light load.

One related art is a switching power supply unit disclosed in Patent Literature 1 (JP 2010-239778A). FIG. 1 is a configuration diagram showing a step-down synchronous rectifying type switching power supply unit disclosed in Patent Literature 1. The switching power supply unit comprises a main transistor MP11, a synchronous rectifying transistor MN11, an inductor L1, a capacitor C1, a power supply control circuit 114, a P-channel driver 115, and an N-channel driver 116A. When the main transistor MP11 is turned on by the P-channel driver 115 (the synchronous rectifying transistor MN11 is turned off) in the switching power supply unit, a current flows from the power supply 111 to the capacitor C1 through the main transistor MP11 and the inductor L1, to charge the capacitor C1. When the synchronous rectifying transistor MN11 is turned on by the N-channel driver 116A (the main transistor MP11 is turned off), a current flows from the synchronous rectifying transistor MN11 to the capacitor C1 through the inductor L1 due to energy accumulated in the inductor L1, to charge the capacitor C1. In the case of the latter, when the load current is small, there is a case that a direction of the current flowing through the inductor L1 is reversed (flow backward). Due to reverse current, energy is lost and power efficiency is lowered. For this reason, change in voltage V_LX1 at a node LX1 is detected by the N-channel driver 116A, and the synchronous rectifying transistor MN11 is turned off when the direction of the current is reversed.

FIG. 2 shows operation waveforms of the N-channel driver 116A. When a power supply control circuit 114 switches a control signal PRDRV_N from "L" to "H" (the control signal PRDRV_P changes from "L" (a low level) to "H" (a high level), so that the main transistor MP11 is turned off), a drive signal DRV_N changes from "L" to "H" and the synchronous rectifying transistor MN11 changes from the off state to the on state, thereby the current flows from the synchronous rectifying transistor MN11 to the capacitor C1 through the inductor L1. As a result, the voltage V_LX1 at the node LX1 has a negative voltage lower than ground voltage (GND). After that, the current flowing through the inductor L1 decreases and the voltage at the node LX1 increases as time passes. When the current flowing through the inductor L1 becomes zero, the voltage V_LX1 at the node LX1 also becomes zero. After that, the reverse current starts to flow from the inductor L1 to the synchronous rectifying transistor MN11. In order to prevent the reverse current, the N-channel driver 116A controls the synchronous rectifying transistor MN11 to be set to the off state when the voltage V_LX1 becomes zero. As a result, lowering of power efficiency due to the reverse current can be prevented.

According to the switching supply unit disclosed in Patent Literature 1, lowering of power efficiency is prevented by preventing generation of the reverse current in a case of a light load. However, the states of the main transistor MP11 and the synchronous rectifying transistor are switched by use of PWM (Pulse Width Modulation) control. An on time period of the main transistor MP11 becomes short in a case of the light load. As a result, an increase in the output voltage due to one switching is reduced. Constant switching is necessary in order to keep output voltage. Constant switching, however, leads to an increase in an operation rate of a circuit. Power efficiency is calculated as a ratio of output power to input power (output power/input power). The input power is calculated by multiplying the entire circuit operation current by input voltage. An increase in an operation rate of a circuit raises a value of input power, causing lowering of power efficiency.

CITATION LIST

[Patent Literature 1]: JP 2010-239778A

SUMMARY OF THE INVENTION

In one embodiment, a step-down DC-DC converter includes: a first switching element provided to connect a power supply and a first node; a second switching element provided to connect the first node and a ground voltage; an inductance element provided between the first node and an output node; a capacitor provided between the output node and the ground voltage; and a control circuit configured to control an output voltage at the output node. The control circuit includes: a pulse signal generating circuit configured to determine an on period of the first switching element such that the on period of the first switching element shorter as a load current flowing through a load from the output node becomes smaller, and generate a pulse signal which has a pulse width corresponding to the determined on period; a minimum pulse width limiting circuit configured to generate a pulse signal which has a predetermined minimum pulse width as a minimum pulse width signal; a selector configured to select one of the pulse signal and the minimum pulse width signal as a selection pulse signal; a driver circuit configured to switch the first switching element and the second switching element based on the selection pulse signal such that one of the switching elements is set to an off state when the other of the switching elements is set to an on state; and a reverse current detecting circuit configured to detect a reverse current flowing to the first node from the output node. The driver circuit controls the second switching element to be set to an off state when the reverse current is detected, and the selector selects the pulse signal when the reverse current is not detected, and selects a signal with a shorter pulse width of the minimum pulse width signal and the pulse signal when the reverse current is detected.

In another embodiment, a step-up DC-DC converter includes: an inductance element provided between a power supply and a second node; a first switching element provided between the second node and an output node; a second switching element provided to connect the second node and a ground voltage; a capacitor provided between the output node and the ground voltage; and a control circuit configured to control an output voltage at the output node. The control circuit includes: a pulse signal generating circuit configured to determine an on period of the second switching element such that an on period of the second switching element became shorter as a load current flowing to a load from the output node is smaller, and generate a pulse signal with a pulse width corresponding to the determined on period; a minimum pulse width limiting circuit configured to generate a pulse signal with a predetermined minimum pulse width as a minimum pulse width signal; a selector configured to select one of the pulse signal and the minimum pulse width signal as a selection pulse signal; a driver circuit configured to switch the first switching element and the second switching element based on the selection pulse signal such that one of the switching elements is set to an off state as the other of the switching elements is set to an on-state; and a reverse current detecting circuit configured to detect the reverse current flowing to the second node from the output node. The driver circuit controls the first switching element is set to an off-state when the reverse current is detected, and the selector selects the pulse signal when the reverse current is not detected, and selects a signal with a greater pulse width of the minimum pulse width signal and the pulse signal when the reverse current is detected.

In further another embodiment, a step-up/step-down DC-DC converter comprising a step-down DC-DC converter and a step-up DC-DC converter.

Each embodiment provides a DC-DC converter which can improve power efficiency in a case of a light load.

DESCRIPTION OF EMBODIMENTS

Hereinafter, embodiments of the present invention will be described below with reference to the attached drawings.

First Embodiment

Figure 1:
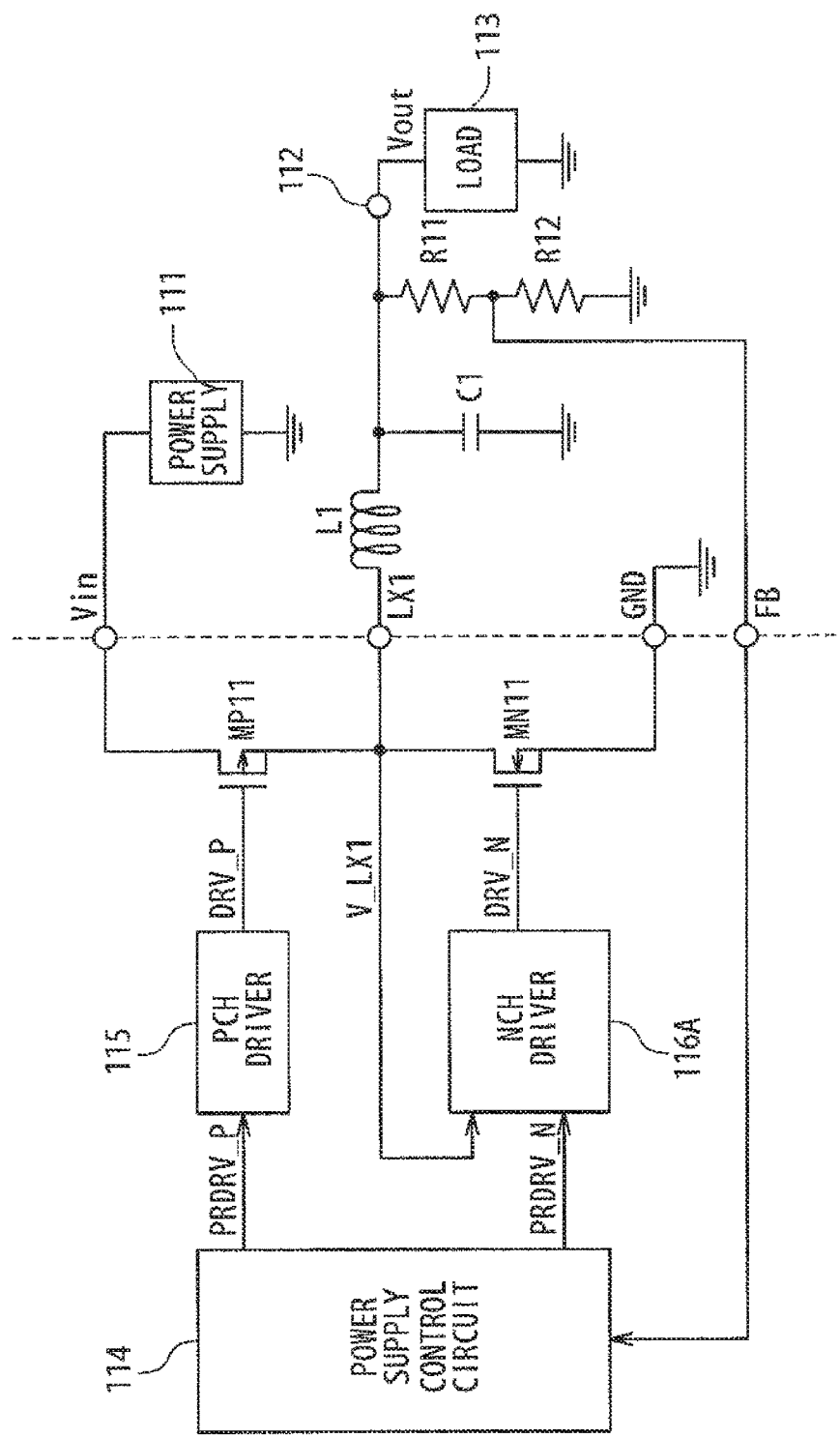
FIG. 1 is a configuration diagram showing a step-down synchronous rectifying switching supply unit disclosed in Patent Literature 1.
Figure 2:
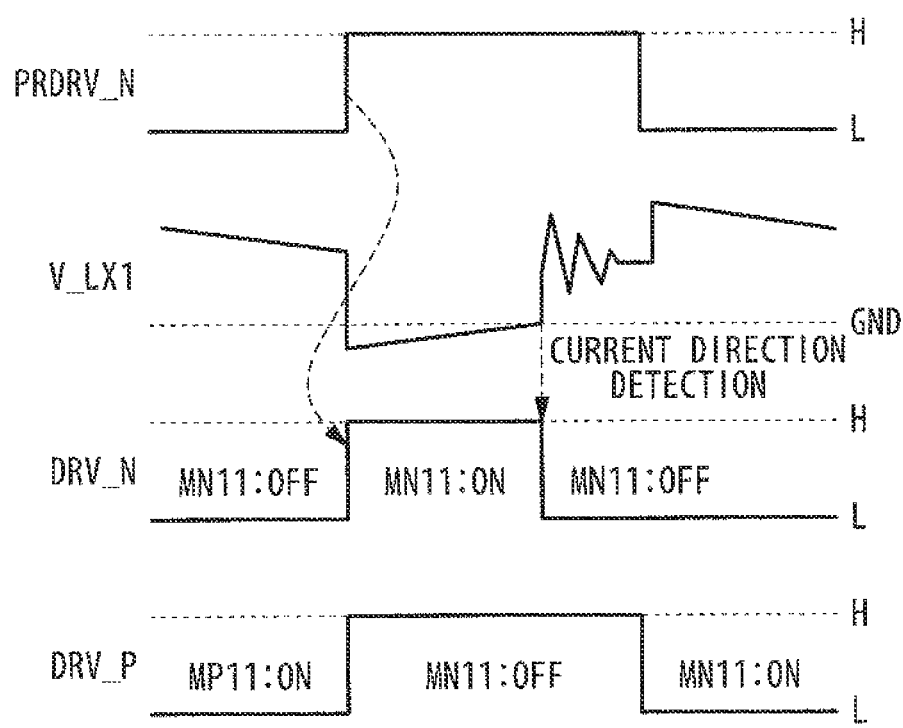
FIG. 2 shows operation waveforms of an N-channel driver.
Figure 3:
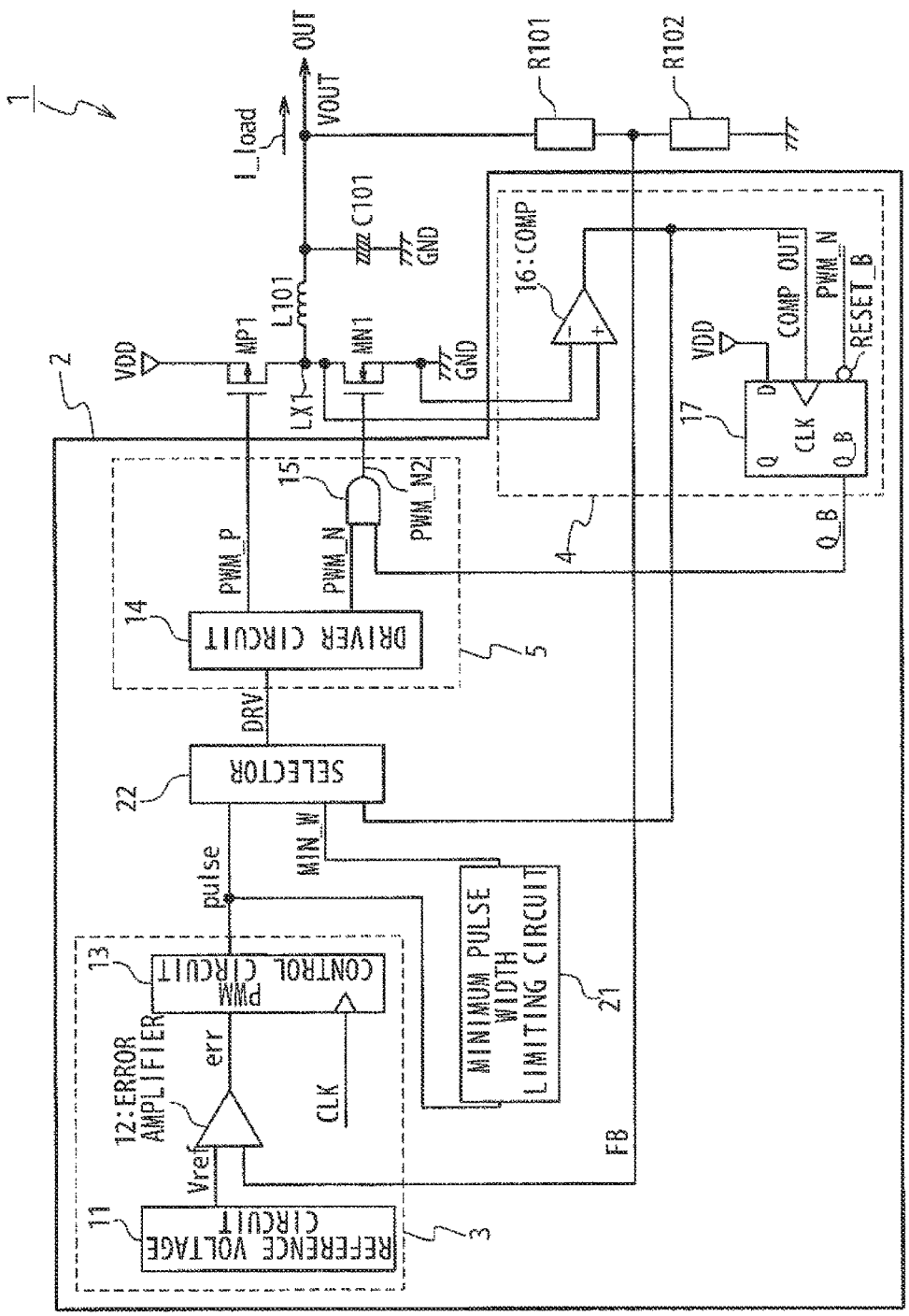
FIG. 3 is a block diagram showing a DC-DC converter according to a first embodiment.

FIG. 3 is a block diagram showing a DC-DC converter 1 according to a first embodiment. The DC-DC converter 1 according to the embodiment is a step-down synchronous rectifying type converter. As shown in FIG. 3, the DC-DC converter 1 comprises a first transistor MP1, a second transistor MN1, an inductance element L101, a capacitor C101, and a control circuit 2.

The first transistor MP1 is a P-channel transistor and is provided between a power supply VDD and a first node LX1. The second transistor MN1 is an N-channel transistor, and is provided between the first node LX1 and ground GND. The inductance element L101 is provided between the first node LX1 and an output node OUT. The capacitor C101 is provided between the output node OUT and the ground GND. Resistive elements R101 and R102 are connected in series between the output node OUT and the ground GND to divide an output voltage.

The control circuit 2 comprises a function of controlling the output voltage by switching the on/off states of the first transistor MP1 and the second transistor MN1. As shown in FIG. 3, the control circuit 2 comprises a pulse signal generating circuit 3, a reverse current detecting circuit 4, a driver section 5, a minimum pulse width limiting circuit 21, and a selector 22.

The reverse current detecting circuit 4 comprises a function of detecting reverse current flowing from the output node OUT toward the ground GND through the first node LX1 and the second transistor MN1. The reverse current detecting circuit 4 comprises a comparator 16 and a D-type flip-flop circuit 17. The comparator 16 compares a voltage at the first node LX1 and the ground voltage, and detects the reverse current when voltage at the first node LX1 is greater than the ground voltage, to generate a high-level signal as a comparison result signal COMP_OUT. When receiving the high-level signal as a comparison result signal COMP_OUT, the D-type flip-flop circuit 17 outputs a low-level signal as a control signal Q_B until a PWM_N signal which will be mentioned later, is set to a low level.

The pulse signal generating circuit 3 determines an on period of the first transistor MP1 so that the on period of the first transistor MP1 becomes shorter as load current flowing from the output node OUT to a load becomes smaller, and generates a pulse signal "pulse" having a pulse width corresponding to the determined on period. The pulse signal generating circuit 3 comprises a reference voltage circuit 11, an error amplifier 12, and a PWM control circuit 13. The reference voltage circuit 11 generates a reference voltage Vref corresponding to a target voltage. The error amplifier 12 is connected to a node between the resistive elements R101 and R102 at one input, and is connected to the reference voltage circuit 11 at the other input. The error amplifier 12 compares a voltage at the node between the resistive element R101 and the resistive element R102 (hereinafter, to be referred to as feedback voltage FB) with the reference voltage Vref, and generates an error signal "err" showing a difference between the feedback voltage FB and the reference voltage Vref when the feedback voltage FB is smaller than the reference voltage Vref. The PWM control circuit 13 determines a pulse width based on the error signal err so that the pulse width is longer as a difference between the feedback voltage FB and the reference voltage Vref is greater, and generates a pulse signal "pulse" in synchronization with a clock signal.

The minimum pulse width limiting circuit comprises a function of generating a minimum width pulse signal MIN_W having a predetermined pulse width. The minimum pulse width limiting circuit receives the pulse signal "pulse", and generates the minimum width pulse signal MIN_W in synchronization with the pulse signal.

The selector 22 comprises a function of selecting the pulse signal "pulse" as a selection signal DRV when no reverse current flows, and selecting a signal with a greater pulse width of the minimum width pulse signal MIN_W and the pulse signal "pulse", as a selection signal DRV, when the reverse current flows. The selector 22 initially selects the pulse signal "pulse" as the selection signal DRV. When the COMP_OUT signal is switched to the high level (when the reverse current is detected), the selector 22 selects as the selection signal DRV, the signal with a greater pulse width of the pulse signal "pulse" and the minimum width pulse signal MIN_W, until a PWM_N2 signal which will be mentioned later, is set to the high level.

The driver section 5 comprises a function of controlling the first transistor MP1 and the second transistor MN1. The driver section 5 comprises a driver circuit 14 and an AND circuit 15. The driver circuit 14 generates a signal which is the same as the selection signal DRV, as the control signal PWM_P, and supplies the signal to the gate of the first transistor MP1. The driver circuit 14 generates a signal which is the same as the selection signal DRV, as the control signal PWM_N, and supplies the signal to the AND circuit 15. The AND circuit 15 receives the control signal PWM_N at one input and receives the control signal Q_B at the other input. The AND circuit 15 generates the control signal PWM_N2 as an output signal, and supplies the generated signal to the gate of the second transistor MN1. According to such a configuration, the high-level signal as the control signal Q_B is supplied to the AND circuit 15 when no reverse current flows, and the AND circuit 15 supplies the signal which is the same as the control signal PWM_N, to the gate of the second transistor MN1 as the control signal PWM_N2. As a result, the on/off state of the second transistor MN1 is switched based on the control signal PWM_N2 (selection signal DRV). On the other hand, when the reverse current flows, a low-level signal is supplied to the AND circuit 15 as the control signal Q_B. As a result, the AND circuit 15 supplies a low-level signal as the control signal PWM_N2, to the gate of the second transistor MN1 irrespective of the control signal PWM_N. Consequently, the second transistor MN1 is controlled to be set to the off state, irrespective of the control signal PWM_N2 (selection signal DRV).

Next, an operation method of the DC-DC converter according to the present embodiment will be described.

Figure 4:
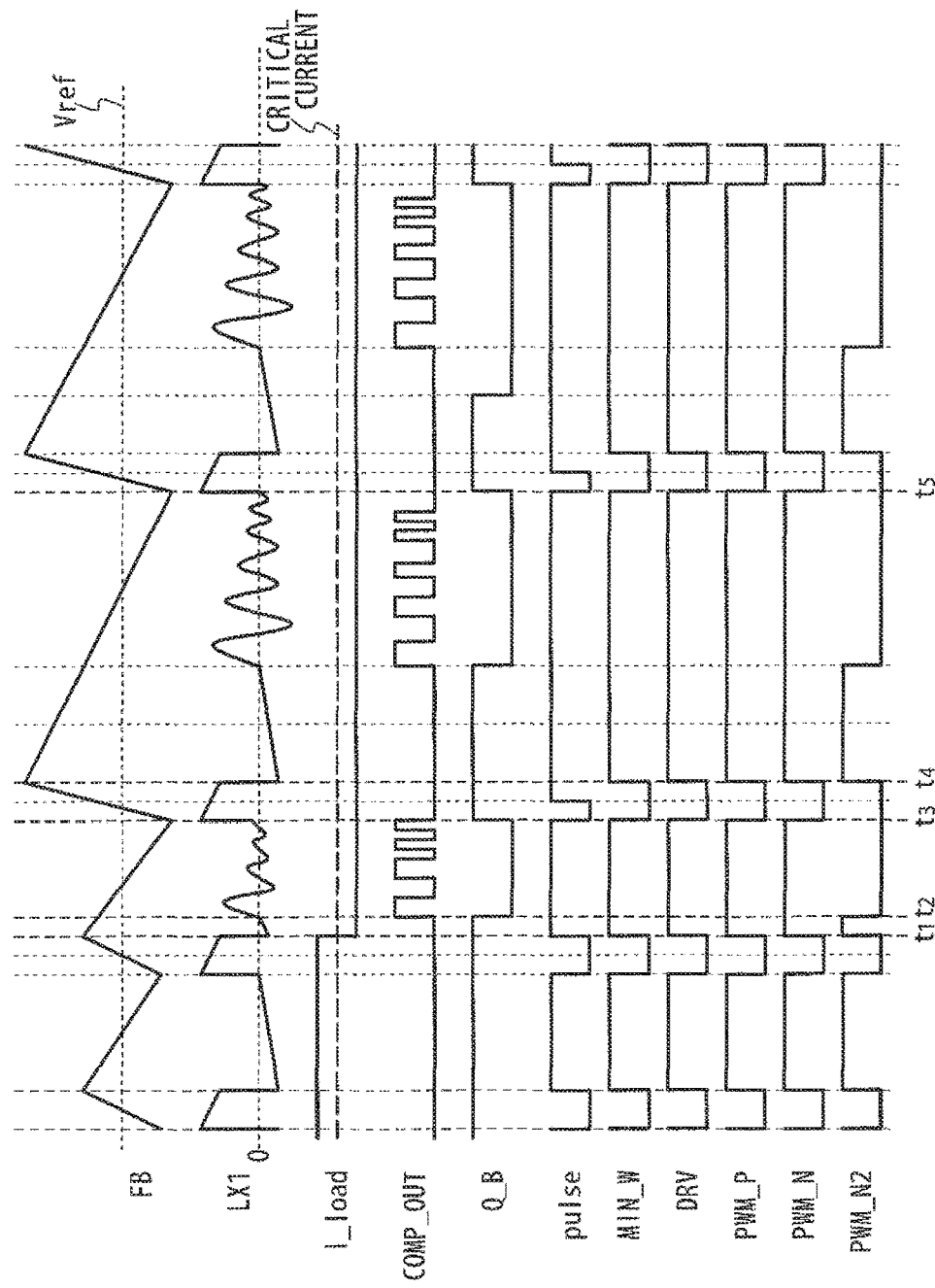
FIG. 4 is a diagram showing timing charts in an operation method of the DC-DC converter in the first embodiment.

FIG. 4 is a diagram showing timing charts of an operation method of the DC-DC converter 1. FIG. 4 shows the timing charts of the feedback voltage FB, voltage at the first node LX1, load current I_load, the comparison result signal COMP_OUT, the control signal Q_B, the pulse signal "pulse", the minimum width pulse signal MIN_W, the selection signal DRV, the control signal PWM_P, the control signal PWM_N, and the control signal PWM_N2.

In FIG. 4, the load current I_load is greater than a critical current before a time t1 and the load current I_load is smaller than the critical current after the time t1. It should be noted that the critical current is a current showing whether or not the reverse current flows.

As mentioned above, the load current I_load is greater than the critical current before the time t1. Since the load current I_load is great, the pulse signal generating circuit 3 generates as the pulse signal "pulse", the signal with a greater pulse width, compared with a case where the load current I_load is small. Additionally, the reverse current does not flow since the load current I_load is larger than the critical current. Therefore, the comparison result signal COMP_OUT is set to the low level, and the selector 22 selects the pulse signal "pulse" as the selection signal DRV. Additionally, the AND circuit 15 supplies the control signal PWM_N as the control signal PWM_N2, to the gate of the second transistor MN1, since the high-level signal is outputted as the control signal Q_B. Consequently, the state of the first transistor MP1 and the second transistor MN1 is switched based on the pulse signal "pulse". That is to say, the first transistor MP1 is set to the on state and the second transistor MN1 is set to the off state when the pulse signal "pulse" is in the low level. During the time when the first transistor MP1 is in the on state (when the pulse signal "pulse" is in the low level), the output voltage increases and also the feedback voltage FB increases.

On the other hand, the load current I_load is smaller than the critical current after the time t1 as mentioned above. Since the load current I_load is small, the pulse signal generating circuit 3 generates the signal with a small pulse width as the pulse signal "pulse". The load current has magnitude which will generate the reverse current. That is to say, the first transistor MP1 is switched from the on state to the off state and the second transistor MN1 is switched from the off state to the on state at the time t1, when the selection signal DRV is switched from the low level to the high level. As a result, the voltage at the first node LX1 is switched to a voltage lower than the ground voltage. After that, the voltage at the first node LX1 increases and exceeds the ground voltage. In the example shown in FIG. 4, the voltage at the first node LX1 exceeds the ground voltage at time t2. When the voltage at the first node LX1 exceeds the ground voltage, the comparator 16 detects the reverse current and generates the high-level signal as the comparison result signal COMP_OUT. Consequently, the D-type flip-flop circuit 17 outputs the low-level signal as the control signal Q_B until the control signal PWM_N is switched to the low level. As a result, the AND circuit 15 supplies the low-level signal to the gate of the second transistor MN1 as the control signal PWM_N2, to control the second transistor MN1 to be set to the off state. Since the second transistor MN1 is set to the off state, the reverse current is prevented.

When receiving the high-level signal as the comparison result signal COMP_OUT at a time t2, the selector 22 selects the signal with a greater pulse width of the minimum width pulse signal MIN_W and the pulse signal "pulse", as the selection signal DRV. In FIG. 4, the minimum width pulse signal MIN_W is selected as the selection signal DRV, since the pulse width of the minimum width pulse signal MIN_W is larger than the pulse width of the pulse signal "pulse". As a result, the driver circuit 14 supplies the minimum width pulse signal MIN_W to the gate of the first transistor MP1 as the control signal PWM_P. As a result, the first transistor MP1 is controlled to be set to the on state for a longer period, compared with a case where the pulse signal "pulse" is selected. In FIG. 4, the first transistor MP1 is in the on state and the feedback voltage FB increases from the time t3 to the time t4. As a result, the feedback voltage FB greatly increases, compared with a case where the pulse signal "pulse" is selected. Since the feedback voltage FB greatly increases, a period until the feedback voltage FB becomes lower than the reference voltage Vref next becomes longer, and the period until the first transistor MP1 is switched next (time t5) becomes longer.

According to the embodiment as mentioned above, the selector 22 selects the signal with a greater pulse width of the pulse signal "pulse" and the minimum width pulse signal MIN_W in a case of a light load in which the reverse current will flow. Therefore, the first transistor MP1 is in the on state during a period in which the pulse width is greater than the pulse width of the minimum width pulse signal MIN_W even in a case of a light load. An increment of the output voltage is increased, and the period until the feedback voltage FB falls below the reference voltage Vref next becomes longer. Since the switching operation is not performed until the feedback voltage FB falls below the reference voltage Vref, an intermittent operation can certainly be performed. Since a circuit does not continuously operate, an increase in power consumption can be prevented and power efficiency can be improved.

Second Embodiment

Next, the second embodiment will be described. In the first embodiment, the step-down DC-DC converter has been described. In the second embodiment, a step-up DC-DC converter will be described.

Figure 5:
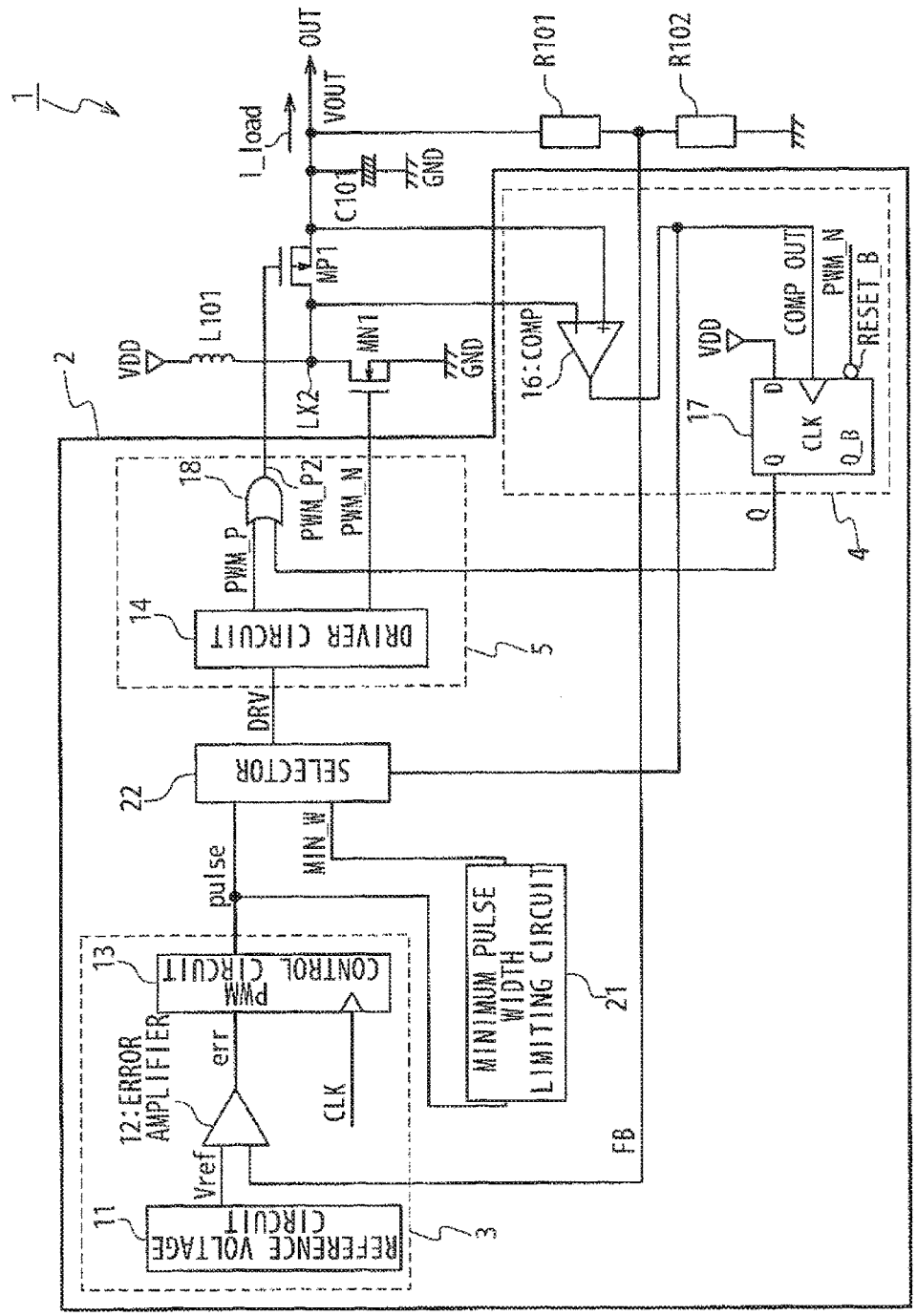
FIG. 5 is a block diagram showing a step-up DC-DC converter according to a second embodiment.

FIG. 5 is a block diagram showing a step-up DC-DC converter 1 according to the second embodiment. In the embodiment, the DC-DC converter 1 comprises the first transistor MP1, the second transistor MN1, the inductance element L101, the capacitor C101, and the control circuit 2, as in the case of the first embodiment. It should be noted that the inductance element L101 is provided between the power supply VDD and a second node LX2. The first transistor MP1 is provided between the second node LX2 and the output node OUT. Configurations of the reverse current detecting circuit 4 and the driver section 5 are changed. Others are the same as the first embodiment.

As shown in FIG. 5, the reverse current detecting circuit 4 comprises the comparator 16 and the D-type flip-flop circuit 17, as in the case of the first embodiment. It should be noted that the comparator 16 compares a voltage at the output node OUT (output voltage) and a voltage at the second node LX2, to detect the reverse current when the output voltage is smaller than the voltage at the second node LX2 and output the high-level signal as the comparison result signal COMP_OUT. After receiving the high-level signal as the comparison result signal COMP_OUT, the D-type flip-flop circuit 17 outputs the high-level signal as a control signal Q until a control signal PWM_N is set to the low level.

The driver section 5 comprises the driver circuit 14 and an OR circuit 18. The driver circuit 14 supplies the same signal as a selection signal DRV, to the OR circuit 18 as the control signal PWM_P. The driver circuit 14 supplies the same signal as the selection signal DRV, to the gate of the second transistor MN1, as the control signal PWM_N. The OR circuit 18 receives the control signal PWM_P at one input and receives the control signal Q at the other input. An output signal of the OR circuit 18 is supplied to the gate of the first transistor MP1 as a signal PWM_P2.

Figure 6:
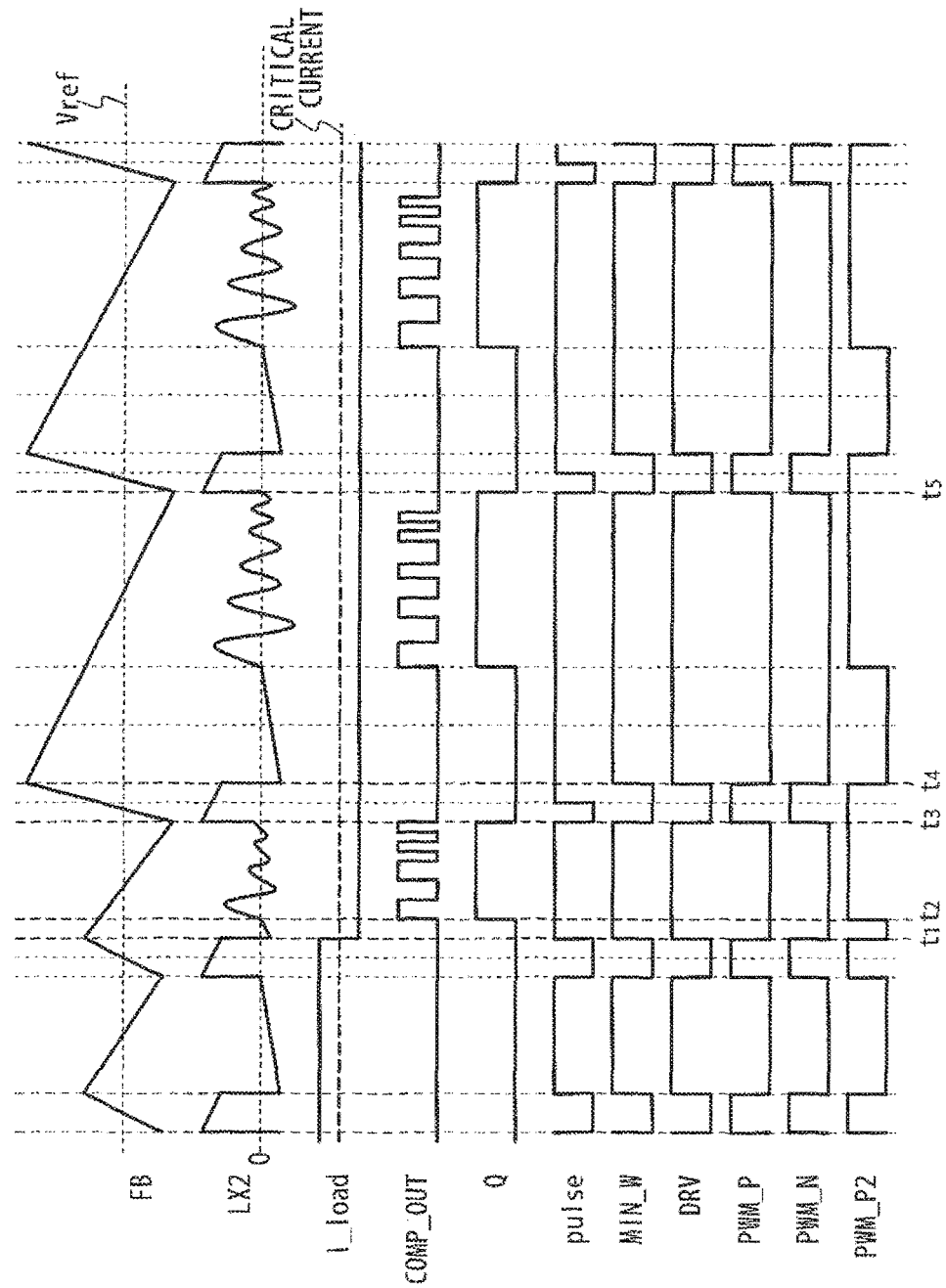
FIG. 6 is a diagram showing timing charts in an operation method of the DC-DC converter according to the second embodiment.

Next, an operation method of the DC-DC converter according to the embodiment will be described. FIG. 6 is a diagram showing timing charts in the operation method of the DC-DC converter according to the embodiment. As shown in FIG. 6, load current I_load exceeds the critical current before the time t1 while the load current I_load falls below the critical current after the time t1.

The reverse current does not flow before the time t1 since the load current I_load exceeds the critical current. Therefore, the comparator 16 generates the low-level signal as the comparison result signal COMP_OUT. Then, the selector 22 selects the pulse signal "pulse" as the selection signal DRV. The D-type flip-flop circuit 17 outputs the low-level signal as the control signal Q. As a result, the OR circuit 18 in the driver section 5 supplies the control signal PWM_P to the gate of the first transistor MP1 as the control signal PWM_P2. That is to say, the states of the first transistor MP1 and the second transistor MN1 are switched based on the pulse signal "pulse" before the time t1.

On the other hand, the load current I_load is smaller than the critical current after the time t1. Since the load current I_load is small, the pulse signal generating circuit 3 outputs the signal with a shorter pulse width as the pulse signal "pulse". When the reverse current flows (time t3), the comparator 16 detects the reverse current and outputs the high-level signal as the comparison result signal COMP_OUT. After receiving a high-level signal as the comparison result signal COMP_OUT, the D-type flip-flop circuit 17 outputs the high-level signal as the control signal Q. Consequently, the OR circuit 18 supplies the high-level signal to the gate of the first transistor MP1 as the control signal PWM_P2, controlling the first transistor MP1 to be set to the off state. As a result, the reverse current is prevented.

Since the high-level signal is generated as the comparison result signal COMP_OUT, the selector 22 selects the signal with a greater pulse width of the pulse signal "pulse" and the minimum width pulse signal MIN_W, as the selection signal DRV. As shown in FIG. 6, the minimum width pulse signal MIN_W is selected as the selection signal DRV. Consequently, the second transistor MN1 is in the on state and the output voltage and the feedback voltage FB increase during a period corresponding to the pulse width of the minimum width pulse signal MIN_W after the time t1. In the example shown in FIG. 6, the second transistor MN1 is in the on state and the output voltage and the feedback voltage FB increase during a period from the time t3 to the time t4. As a result, an increment of the output voltage increases, and the period until the feedback voltage FB falls below the reference voltage Vref next, becomes longer, as in the case of the first embodiment. Continuous operation of a circuit in a case of a light load is prevented, making it possible to prevent an increase in power consumption and improve power efficiency.

Third Embodiment

Figure 7:
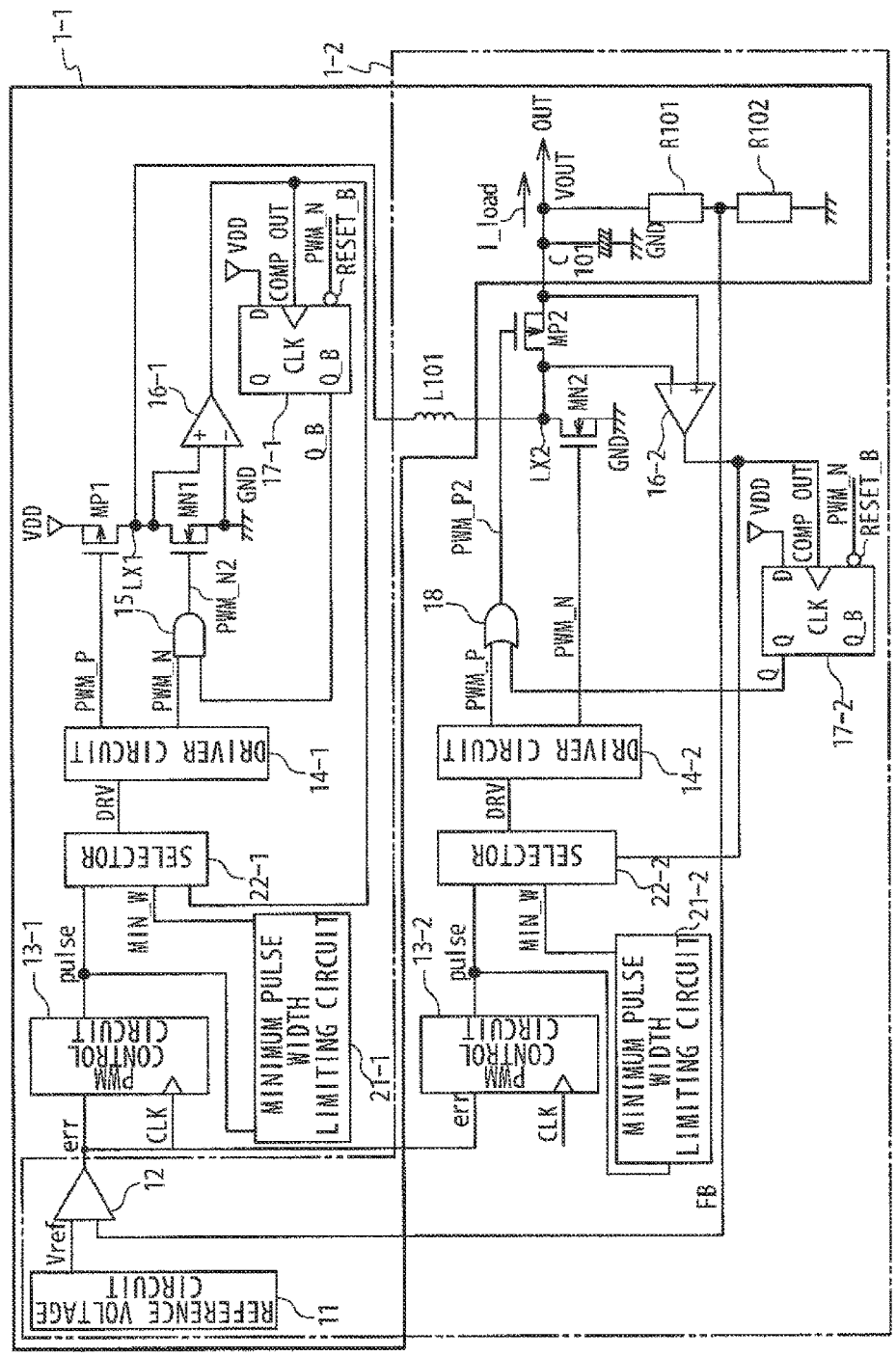
FIG. 7 is a block diagram showing the step-up/step-down DC-DC converter according to a third embodiment.

Next, a third embodiment will be described. In the present embodiment, a step-up/step-down DC-DC converter which is a combination of the step-down DC-DC converter according to the first embodiment and the step-up DC-DC converter according to the second embodiment, will be described. FIG. 7 is a block diagram showing the step-up/step-down DC-DC converter according to the third embodiment.

As shown in FIG. 7, the step-up/step-down DC-DC converter according to the present embodiment comprises a step-down DC-DC converter 1-1 and a step-up DC-DC converter 1-2. The configuration of the step-down DC-DC converter 1-1 is the same as the first embodiment and the configuration of the step-up DC-DC converter 1-2 is the same as the second embodiment. The reference voltage circuit 11, the error amplifier 12, and the inductance element L101 are used in common between the step-down DC-DC converter 1-1 and the step-up DC-DC converter 1-2.

More in detail, the first transistor MP1 of the step-down DC-DC converter 1-1 is provided between the power supply VDD and the first node LX1. The second transistor MN1 of the step-down DC-DC converter 1-1 is provided between the first node LX1 and the ground voltage GND. The inductance element L101 is provided between the first node LX1 and the second node LX2. The first transistor MP2 of the step-up DC-DC converter 1-2 is provided between the second node LX2 and the output node OUT. The second transistor MN2 of the step-up DC-DC converter 1-2 is provided between the second node LX2 and the ground voltage GND.

In the present embodiment, the control of the step-up DC-DC converter 1-2 is performed so that the first transistor MP1 is set to the on state and the second transistor MN1 is set to the off state at the time of step-down. The step-down DC-DC converter 1-1 operates in the same way as the first embodiment. At the time of step-up, the control of the step-down DC-DC converter 1-1 is performed so that the first transistor MP1 is set to the on state and the second transistor MN1 is set to the off state. The step-up DC-DC converter 1-2 operates in the same way as the second embodiment. Consequently, continuous operation of a circuit in a case of a light load is prevented, making it possible to prevent increase in power consumption and improve power efficiency, as in the case of the above-mentioned embodiments.

What is claimed is:

1. A DC-DC converter comprising:
   a first switching element connected between a first node and a power supply;
   a second switching element connected between said first node and a ground voltage and configured to output an output voltage to an output node;
   a pulse signal generating circuit configured to detect the output voltage, and to generate a pulse signal used to control on/off periods of said first and second switching elements based on a comparison result of the detected output voltage and a reference voltage;
   a minimum pulse width limiting circuit configured to generate a minimum pulse width signal having a minimum pulse width which is wider than a minimum pulse width of the pulse signal;
   a selector configured to select one of the pulse signal and the minimum pulse width signal as a selection pulse signal;
   a driver circuit configured to switch said first switching element and said second switching element based on the selection pulse signal; and
   a reverse current detecting circuit configured to detect a reverse current flowing to said first node,
   wherein said driver circuit controls said second switching element to be set to an off state according to a first output of the reverse current detecting circuit, and
   wherein said selector selects one of the pulse signal and the minimum pulse width signal in response to a second output of the reverse current detecting circuit when a reverse current is detected and outputs said selection pulse signal to said driver circuit.

2. The DC-DC converter according to claim 1, wherein said pulse signal generating circuit comprises:
   a reference voltage circuit configured to generate the reference voltage;
   an error amplifier configured to compare the output voltage with the reference voltage to generate an error signal showing a difference between the reference voltage and the output voltage; and
   a PWM control circuit configured to determine the on period of said first switching element based on the error signal, and generate the pulse signal.

3. The DC-DC converter according to claim 1, wherein said reverse current detecting circuit comprises:
   a comparator configured to compare a voltage across said first switching element and a voltage across said second switching element which are objects for the reverse current to be detected, and
   wherein said selector selects one of the pulse signal and the minimum pulse width signal, as the selection pulse signal based on an output of said comparator.

4. The DC-DC converter according to claim 3, wherein said comparator compares a voltage at said first node and the ground voltage and generates a comparison resultant signal showing a comparison result.

5. The DC-DC converter according to claim 1,
   wherein said DC-DC converter further comprises:
   an inductance element provided between said output node and a first node; and
   a capacitor provided between said output node and a ground voltage.

6. A DC-DC converter comprising:
   a first switching element connected between a first node and an output node;
   a second switching element connected between said first node and a ground voltage and configured to output an output voltage to said output node;
   a pulse signal generating circuit configured to detect the output voltage, and to generate a pulse signal used to control on/off periods of said first and second switching elements based on a comparison result of the detected output voltage and a reference voltage;
   a minimum pulse width limiting circuit configured to generate a minimum pulse width signal having a minimum pulse width which is wider than a minimum pulse width of the pulse signal;
   a selector configured to select one of the pulse signal and the minimum pulse width signal as a selection pulse signal;
   a driver circuit configured to switch said first switching element and said second switching element based on the selection pulse signal; and
   a reverse current detecting circuit configured to detect a reverse current flowing to said first node,
   wherein said driver circuit controls said first switching element to be set to an off state according to a first output of the reverse current detecting circuit, and
   wherein said selector selects one of the pulse signal and the minimum pulse width signal in response to a second output of the reverse current detecting circuit when a reverse current is detected and outputs said selection pulse signal to said driver circuit.

7. The DC-DC converter according to claim 6, wherein said pulse signal generating circuit comprises:
   a reference voltage circuit configured to generate the reference voltage;
   an error amplifier configured to compare the output voltage with the reference voltage to generate an error signal showing a difference between the reference voltage and the output voltage; and
   a PWM control circuit configured to determine the on period of said first switching element based on the error signal, and generate the pulse signal.

8. The DC-DC converter according to claim 6, wherein said reverse current detecting circuit comprises:
   a comparator configured to compare a voltage across said first switching element and a voltage across said second switching element which are objects for the reverse current to be detected, and
   wherein said selector selects one of the pulse signal and the minimum pulse width signal, as the selection pulse signal based on an output of said comparator.

9. The DC-DC converter according to claim 8, wherein said comparator compares a voltage at said first node and a voltage at said output node and generates a comparison resultant signal showing a comparison result.

10. The DC-DC converter according to claim 6,
wherein said DC-DC converter further comprises:
an inductance element provided between a power supply and a first node; and
a capacitor provided between said output node and a ground voltage.

* * * * *